Figure 1:
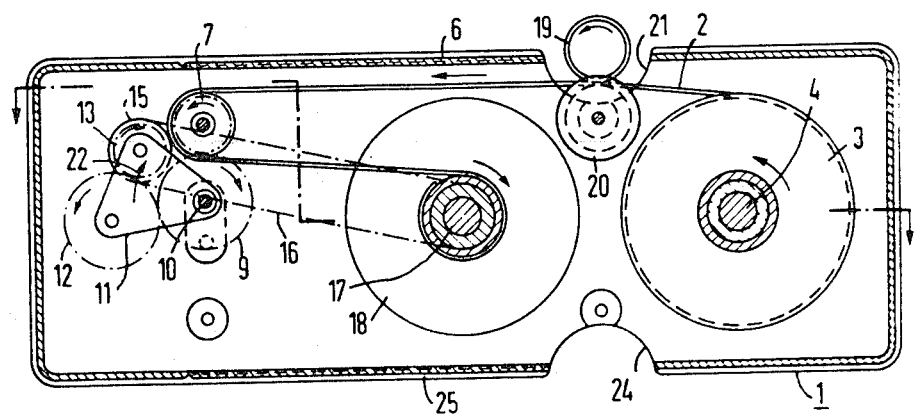

United States Patent [19]
Hotz

[11] 3,708,818
[45] Jan. 9, 1973

[54] APPARATUS FOR CLEANING TUBES AND THE LIKE

[75] Inventor: Karl Hotz, Erlangen, Germany

[73] Assignee: Siemens Aktiengesellschaft, Berlin and Munich, Germany

[22] Filed: Nov. 18, 1970

[21] Appl. No.: 90,671

[30] Foreign Application Priority Data

Nov. 26, 1969 Germany..................P 69 45 822.6

[52] U.S. Cl. ..........................15/97, 15/101, 73/52, 176/26
[51] Int. Cl................................G21f 9/34
[58] Field of Search...15/97, 99, 101, 102, 4, 104.04, 15/218.1, 256.51; 73/52; 176/26; 242/55.1, 55, 62, 56.9, 65, 67.2, 67.3, 71.2, 199

[56] References Cited

UNITED STATES PATENTS

| 1,991,371 | 2/1935 | Blanckenburg | 15/104.04 |
|---|---|---|---|
| 2,401,530 | 6/1946 | Vought | 242/67.2 |

FOREIGN PATENTS OR APPLICATIONS

| 19,461 | 1900 | Great Britain | 15/97 R |

*Primary Examiner*—Leon G. Machlin
*Attorney*—Curt M. Avery, Arthur E. Wilfond, Herbert L. Lerner and Daniel J. Tick

[57] ABSTRACT

An apparatus for cleaning a tube used to accommodate reactor fuels has a housing, a feed spool rotatably mounted in the housing and a wiping band for cleaning the tube. Also provided are a take-up spool rotatably mounted in the housing for receiving the band after the same passes over and in contact with the tube. Also provided is an idler pulley rotatably mounted in the housing away from the feed spool to direct the wiping band parallel to a side of the housing and to reverse the direction of travel of the band before the latter is received by the take-up spool. A drive mechanism connected to the take-up spool rotates the latter to take up the wiping band. The housing has an opening through which the tube is insertable into the housing. The housing also has a breakout to provide an opening through which a sensor is insertable for measuring the contamination on the wiping band after the latter passes over the tube.

3 Claims, 2 Drawing Figures

APPARATUS FOR CLEANING TUBES AND THE LIKE

My invention relates to an apparatus for cleaning tubes, especially for the purpose of decontaminating tubes or the like that are used to accommodate reactor-fuel rods, these rods being filled with pellets containing plutonium dioxide ($PuO_2$). In the production of nuclear fuel rods, pellets containing plutonium dioxide are inserted into an envelope tube. The poisonous plutonium dioxide can deposit in the form of dust on the ends of the envelope tubes.

It is an object of my invention to provide an apparatus for automatically cleaning tubes and the like. Subsidiary to this object, it is an object of my invention to provide such an apparatus wherein the tubes are cleaned by a wiping action.

It is another object of my invention to provide an apparatus for cleaning tubes which is adaptable for automatically testing whether or not the decontamination procedure applied to a tube is completed.

According to the invention, a feed spool or reel is rotatably borne in a magazine. A wiping band for cleaning the tube is at least partially wound on the feed spool. And a take-up spool is rotatably mounted in the housing for receiving the band after the band passes over and in contact with the tube. An idler pulley rotatably mounted in the housing away from the feed spool directs the wiping band parallel to a side of the housing and reverses its direction of travel before the band is received by a take-up spool. In addition, a drive mechanism connects to the take-up spool and rotates the latter to take up the wiping band. The housing has an opening through which the tube is insertable therein. The housing side has a breakout to provide an opening through which a sensor is insertable for measuring the contamination on the wiping band after the latter passes over the tube.

Figure 2:
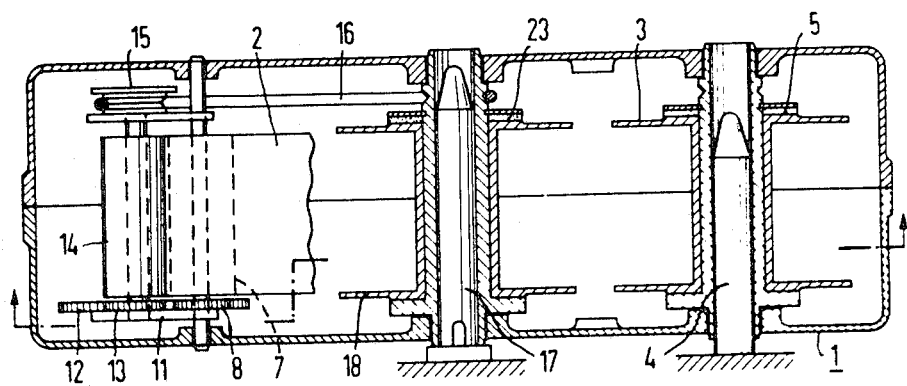

The invention will now be described with reference to the drawing wherein:

FIG. 1 illustrates a cleaning apparatus, partially in section, according to the invention; and, FIG. 2 is a view of the apparatus according to FIG. 1 taken along line II—II.

A magazine or housing 1 contains a feed spool 3 which is fully wound with a wiping band 2. Spool 3 is rotatably borne on a spindle 4. A disc 5 made of foam material retards the easy rotation of spool 3 and holds the wiping band in tension. The wiping band 2 which rolls off the spool 3 is directed parallel to an edge 6 of the magazine 1 and passes over an idler pulley 7 disposed at the other end of the magazine 1. The idler pulley 7 is connected on the same axis with toothed gear 8. Gear 8 engages another toothed gear 9, the latter being secured to drive shaft 10. The drive shaft 10 is constructed so that it may be coupled with the shaft of a drive motor when the magazine is placed on the shaft of the drive motor. In addition, a pivotally borne lever member 11 is secured to the drive shaft 10 and carries an additional toothed gear or idler gear 12. Gear 12 meshes with gear 9 and a third toothed gear 13. Gear 13 is secured to the same shaft as a pressure roller 14. Also on this same shaft, there is provided a drive pulley 15 that carries a drive belt 16. Belt 16 passes over the shaft 17 of a take-up spool 18.

The sheathing tube or hollow tube 19 to be cleaned is placeable on and removable from a rotatable loading member 20. The tube 19 projects with its end into an opening 21 of the magazine 1. At the upper edge 6, the magazine 1 is provided with a breakout in the magazine wall which is suitable for breaking open the magazine to provide an opening.

When the magazine is connected with its drive shaft 10 to the shaft of a motor, the gear 9 drives gear 8 and the idler pulley 7 on the one hand and, on the other hand, gear 13 with the pressure roller 14 are driven via gear 12. In this manner, the wiping band is unwound from spool 3 an comes into contact with a hollow tube 19 that projects into opening 21. $PuO_2$ dust is applied to the wiping band 2 for example, when the tube 19 is the sheathing tube of a reactor fuel rod which is contaminated with $PuO_2$. In the installed position of the magazine 1, the breakout location of the magazine wall is broken out and in the opening thus formed a measuring apparatus projects into the magazine for registering the $PuO_2$ on the wiping band 2. The wiping band 2 is then pulled from the spool 3 by the pressure roller 14 and the idler pulley 7 at a constant velocity and wound up onto the empty spool 18 in the opposite winding direction. By means of the idler pulley 7 disposed near the feed spool 3 and the take-up spool 18 as well as the associated drive mechanism there is obtained first, an even or constant unwinding velocity for the wiping band, and second, a reversal of the winding direction, so that the contaminated side of the wiping band is wound onto the empty spool 18 in a manner to permit the contaminated side of the wiping band to lie inwardly. In addition, the wiping band 2 is directed over almost the entire length of the magazine parallel to one edge 6, so that not only does the tube to be cleaned come easily into contact with the wiping band, but also, space is provided for introducing the sensor of a measuring apparatus for measuring the contamination.

With the ever increasing portion of the wiping band being wound on the take-up spool 18, there occurs an ever increasing slip of the drive belt 16 and the drive disc 15 and/or the shaft 17. This guarantees that the wiping band 2 during take-up will always be wound onto the pick-up spool with a light tension. By means of the arrangement of the gear 13 on a lever with an intermediate gear or idler gear 12, the lever 11 is subjected to a turning moment in the direction of the arrow 22, so that the pressure force of the roller 14 increases in dependence upon the drive moment on the gear 9. The applied pressure of the pressure roller 14 is therefore dependent on the pulling force required for the wiping band 2.

An additional foam material disc 23 on the take-up spool 18 prevents the take-up spool from reversing its direction of rotation and loosening the tension in the wiping band when the drive is not operating. By controlling the drive motor via the sensor and measuring apparatus used to measure the contamination of the wiping band, a guarantee is provided that only so much of the wiping band will be used as is actually necessary for cleaning the tube 19.

An additional opening 24 on the lower edge 25 of the magazine 1 permits using the same components for the magazine halves which lie opposite of each other.

While the invention has been described by means of a specific example and in a specific embodiment, I do not wish to be limited thereto, for obvious modifications will occur to those skilled in the art without departing from the spirit and scope of the invention.

I claim:

1. Apparatus for cleaning a tube used to accommodate reactor fuel rods comprising a housing, a feed spool rotatably mounted in said housing, a wiping band for cleaning the tube, said band being at least partially wound on said feed spool, a take-up spool rotatably mounted in said housing for receiving said band after the same passes over and in contact with said tube, an idler pulley rotatably mounted in said housing away from said feed spool to direct said wiping band parallel to a side of said housing and to reverse the direction of travel of said band before the latter is received by said take-up spool, said housing having an opening through which the tube is insertable into said housing, said side of said housing having a breakout to provide an opening through which a sensor is insertable for measuring the contamination on said wiping band after the latter passes over said tube, and drive means connected to said take-up spool for rotating the latter to take up said wiping band, said drive means comprising a drive shaft and drive belt connecting said drive shaft with said take-up spool, a pressure roller mounted coaxially on said drive shaft; a main drive shaft; lever means pivotally mounted on said main drive shaft for holding said first-mentioned drive shaft in spaced relation to said main drive shaft so as to place said roller in pressure contact with said idler pulley; said first-mentioned drive shaft having an ancillary gear coaxially mounted thereon; an idler gear rotatably mounted on said lever means and engaging said ancillary gear; and said main drive shaft having a drive gear engaging said idler gear; said ancillary gear, said idler gear and said drive gear having a combined gear ratio to permit said drive gear to turn said pressure roller at the same rpm as said idler pulley.

2. In an apparatus according to claim 1, said main drive shaft being disposed in said magazine so as to permit a drive motor to be attachable to the same.

3. In an apparatus according to claim 1, wherein said idler pulley has a pulley shaft rotatably mounted in said magazine, said drive means comprising a pulley gear coaxially mounted with respect to said pulley shaft and engaging said drive gear mounted on said main drive shaft.

* * * * *